US010257472B2

(12) United States Patent
Clemen, Jr. et al.

(10) Patent No.: US 10,257,472 B2
(45) Date of Patent: Apr. 9, 2019

(54) DETECTING AND LOCATING BRIGHT LIGHT SOURCES FROM MOVING AIRCRAFT

(71) Applicant: THE BOEING COMPANY, Chicago, IL (US)

(72) Inventors: Mark J. Clemen, Jr., Port Orchard, WA (US); Donald V. Drouin, Jr., O'Fallon, IL (US); James A. Grossnickle, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 187 days.

(21) Appl. No.: 15/046,224

(22) Filed: Feb. 17, 2016

(65) Prior Publication Data

US 2017/0237947 A1    Aug. 17, 2017

(51) Int. Cl.
| | | |
|---|---|---|
| *H04N 7/18* | (2006.01) | |
| *H04N 5/247* | (2006.01) | |
| *B64D 47/08* | (2006.01) | |
| *H04N 5/225* | (2006.01) | |
| *H04N 5/232* | (2006.01) | |
| *G06T 7/70* | (2017.01) | |
| *G06T 7/579* | (2017.01) | |

(52) U.S. Cl.
CPC ............ *H04N 7/185* (2013.01); *B64D 47/08* (2013.01); *G06T 7/579* (2017.01); *G06T 7/70* (2017.01); *H04N 5/2254* (2013.01); *H04N 5/2258* (2013.01); *H04N 5/23206* (2013.01); *H04N 5/247* (2013.01); *G06T 2207/30212* (2013.01); *G06T 2207/30252* (2013.01)

(58) Field of Classification Search
CPC ....................................................... B64D 47/08
See application file for complete search history.

(56) References Cited

U.S. PATENT DOCUMENTS 7,256,728 B1 *  8/2007  Kenny ............... B64D 45/0015
                                                340/945
9,626,588 B1 *  4/2017  Antaki ................. G06K 9/4661
(Continued)

OTHER PUBLICATIONS

Ashwini Amara; Dissertation and Theses entitled: Object Detection and Tracking Using Uncalibrated Cameras; University of New Orleans Theses and Dissertations. Paper 1184, May 14, 2010.

*Primary Examiner* — William C Vaughn, Jr.
*Assistant Examiner* — Jerry T Jean Baptiste
(74) *Attorney, Agent, or Firm* — Coats & Bennett, PLLC (57) ABSTRACT

A method and system for a light source detection system, comprising an aircraft carrying at least one camera. The system includes a database for storing information about the aircraft's motion, direction, and position and ground location information, such as the onboard navigation system database or an remotely accessible database. The system also includes a processor that accesses the database and is connected to the camera. The processor uses image analysis and processing techniques to determine the ground location corresponding to the light source from an image of that light captured by the camera. It determines the path traveled by that light and estimates its location as being a pre-selected distance vertically above the ground along the path traveled by the light to the aircraft when the image of the light was captured.

30 Claims, 5 Drawing Sheets

(56) References Cited

U.S. PATENT DOCUMENTS

2007/0253607 A1* 11/2007 Higuchi ............. G06K 9/00026
                                                          382/124
2009/0173788 A1*  7/2009 Moraites ................ F41G 3/04
                                                          235/411
2015/0219426 A1*  8/2015 Moraites ............... G01J 5/0022
                                                          89/1.11
2017/0025024 A1*  1/2017 Kabrt ................ G06K 9/00664

* cited by examiner

DETECTING AND LOCATING BRIGHT LIGHT SOURCES FROM MOVING AIRCRAFT

TECHNOLOGICAL FIELD

The technology of the present disclosure relates generally to identifying and locating the position of objects in three dimensions. More specifically, the technological field relates to determining the location of a source of bright light from a moving aircraft.

BACKGROUND

A growing problem for aircraft pilots is the use of lasers by those on the ground who direct laser light toward the aircraft. Laser light can blind or dazzle a pilot. More powerful lasers can damage the aircraft. Similarly, there are those who use firearms to shoot at aircraft. Whether out of mischief or the result of action by a hostile force, those who direct bright light sources at or who shoot at aircraft must be located.

Military aircraft have equipment that targets and returns fire when they are engaged in combat. Civilian aircraft are not so equipped. A convenient onboard capability to detect the sources of laser light or shots from firearms directed against an aircraft would be an advantage in apprehending those responsible.

SUMMARY

Herein is disclosed a bright light source detection and location system, comprising an aircraft carrying at least one camera and a processor with the capability to derive the location of the source from the images captured by the camera. A database for storing information about the aircraft's motion, direction, and position and ground location information, such as the aircraft's onboard computer is also used. The processor is configured to access the database and receive images captured by the camera and to determine a ground location corresponding to the location of a source of bright light detected in the captured images.

An aspect of the disclosure is that the processor is configured to perform a spectral analysis in order to identify light that comes from a laser as opposed to light from a different type of source. The processor can also perform an analysis to identify a muzzle flash. The spectrum of a muzzle flash and its characteristics, such as being of short duration and having a pattern based on the type of firearm being used, can provide information confirming the source of the flash is from a firearm.

Another feature of the disclosure is that the camera or the processor may have the capability to filter the light from the source. The camera may have a polarizing filter or a wavelength filter that removes part of the electromagnetic spectrum to eliminate portions of the image that are irrelevant or that obscure relevant portions. The processor may look for narrow spikes in the intensity of frequencies associated with lasers such as in the red to infrared region of the electromagnetic spectrum or may look for the spectral signature of gunpowder combustion products.

Another aspect of the disclosure is that the processor may be located at an airport instead of being on board the aircraft. Since many incidents involving lasers and firearms take place when aircraft are landing or taking off, a processor located at the airport and which communicates with cameras on inbound and outbound aircraft would be able to provide the same information as an on-board processor without adding the weight of an extra processor to the aircraft. Ground-based processors stationed at an airport may also have more accurate topographic maps of the airport's surroundings that would improve accuracy in locating the source of the bright light.

Yet another aspect of the disclosure is a communications link from the aircraft to local authorities who can receive the location of the source of laser light or the muzzle flash for them to begin their investigation much sooner after the image of the source was captured.

Still another aspect of the disclosure is there may be at least two cameras taking images from different locations on the aircraft or taking images in different ways to increase the likelihood and accuracy of locating the source of light. For example, one camera may be a high resolution camera better able to detect a laser's light and another camera may be a high speed camera for recording images of muzzle flashes. There may also be an array of cameras.

Still another aspect of the disclosure is that a multiplicity of cameras may be spread across more than one aircraft or platform, yet these data may be combined into a coherent information set just as if acquired by a single aircraft.

An aspect of the disclosure is that the processor is configured to estimate a ground location of a source of a light when one camera records an image of a bright light that it determines is harmful and communicates the ground position of the source to authorities.

Another aspect of the disclosure is the use of topographic information to more accurately determine ground location of the person who has the source of light.

Still another aspect of the disclosure is a method of detecting the location of a light source directed at a moving aircraft, including the steps of capturing at least one image of light directed at the aircraft from a light source; determining the speed, direction and orientation of the aircraft at the time the image was captured, determining the direction running from the moving aircraft to the light source when the image was captured; and determining the ground location that corresponds to a preselected vertical distance between the line to the source and the ground.

Yet another aspect of the disclosure is the processing of images captured by different cameras carried on an aircraft to determine if laser light or muzzle flashes are present in the images.

These and other aspects of the disclosure will be apparent to those skilled in the art from a careful reading of the detailed description, accompanied by the following drawings.

BRIEF DESCRIPTION OF THE DRAWINGS

Having thus described variations of the disclosure in general terms, reference will now be made to the accompanying drawings, which are not necessarily drawn to scale, and wherein:

DETAILED DESCRIPTION

Aspects of the present disclosure are directed to the detection and location of the source of bright light by moving aircraft.

Laser light and muzzle flashes are both bright lights. The former is coherent and may subject to little scatter in the atmosphere; the latter are bright and brief, but while the flash itself does little harm at a distance, the bullet that is associated with the muzzle flash may cause harm. The images of both laser and muzzle flash, however, can be captured by a camera.

The term camera is used herein generally to mean a device that is capable of capturing a two-dimensional image, and in particular a device capable of capturing a two-dimensional array of electromagnetic intensity data mapped to a view. The present camera may forward the image as a digital signal so that, for example, an analysis can be performed on the image using a suitably programmed special or general purpose computer. The analysis may include review of the image for any bright or intense lights captured. It may include a spectrum analysis to identify lights that, while they may not be the brightest in the image, are nonetheless red laser lights or have the characteristic spectrum of the combustion gases of gunpowder. The analysis may be a negative analysis, ruling out, for example, the brightest portion of sunlight by filtering the highest intensity light received from the sun, which peaks near 5500 angstroms so that other frequencies are more easily discernable.

Analysis may have a time-dimension to it such as when there are several images of the same location received by the same high-speed camera that may show that a bright light source appeared suddenly at that location and then disappeared suddenly, which may indicate a muzzle flash from a firearm. Depending on the resolution of the camera, a flash of light may have a pattern that may not only serve to confirm that the light is a muzzle flash but also help to determine the type of firearm that was fired.

The advantage of spectral analysis and filtration of the image is that, by ruling out irrelevant light information, the remaining light information can be more quickly identified for its relevance and source location analysis.

The term source in this application refers to the device that generated the light, such as small arms or lasers. The location of the source is most likely located directly below the source such as the location where a person is standing who is holding a laser or small arm, which may be about five feet below the laser. That ground location can be determined by identifying the line to the source given the location and orientation of the camera at the instant the image was captured, and then looking for places along that line that are five feet above the ground. Without an accurate topographic map, the ground is assumed to be level, which assumption may be wrong. For example, if the person holding the source is standing on a ridge line, the source may be appear to be coming from a location far behind the ridgeline.

In order to determine the location of a source, a line is generated from the camera where it was pointing when the image was captured to the location of the light in the captured image. The direction to the light can be determined from the location of the camera that is fixed to a specific part of an aircraft and pointed in a known direction, plus information about the speed, direction, and orientation of the aircraft, and map information regarding the land over which the aircraft was flying when the image was captured. Much of this information is routinely available from the onboard navigation system of an aircraft. The information about the camera, that is, where it is located with respect to the aircraft, can be obtained fairly precisely when the camera is installed. If the camera can be directed, the pan-tilt directions to the camera's servo motors can be ascertained. Installing more than one camera, indeed, installing an array of cameras, will reduce the uncertainty of the location analysis. Obtaining a series of images from the same camera can also reduce uncertainty as an additional image and an additional camera can contribute to the probability that the source location has been accurately determined.

However, a single camera can estimate the location to the source. The quality of the location estimation is based in part on the nature and quality of the ground information. Accurate topographic maps provide better information than a map that assumes level ground. Additional sources of error are in knowing the speed of the aircraft with respect to ground, the direction, the altitude, and the orientation of the aircraft (roll, pitch, yaw).

The weather is also a factor. For example, if the ground air is warm and the air near the aircraft is colder, the change in air temperature with elevation will act as a lens and bend the path of the light rays. This effect is greater if the aircraft is farther from the source or at a higher elevation.

Increasing the number of cameras and having more than one image from each camera can reduce the uncertainty but also complicate processing and increase processing time. There is a tradeoff in accuracy and the number of cameras deployed. However, an array of cameras of very simple construction can be used, with, for example, a small aperture and no focusing lens, and an array of solid state devices for capturing the light. These cameras may include either of two types: semiconductor charge coupled devices (CCD) or N-type complementary metal oxide semiconductors (CMOS). CCD cameras are inexpensive but CMOS cameras are more effective in burst mode and more robust against bright lights. Further technological developments may provide other devices for use in capturing images inexpensively, accurately, effectively, and rapidly.

When an image is captured by a camera and a light in that image is identified as a laser or muzzle flash, the next step is to determine the line between the light and the image of it in the camera when the camera captured it. While this calculation is complex, the analysis is known and can be programmed into a general or special purpose computer. See for example, Ashwini Amara, "Object Detection and Tracking Using Uncalibrated Cameras" (2010). New θ, Orleans Theses and Dissertations, Paper 1184, which is incorporated by reference herein in its entirety.

Figure 1:
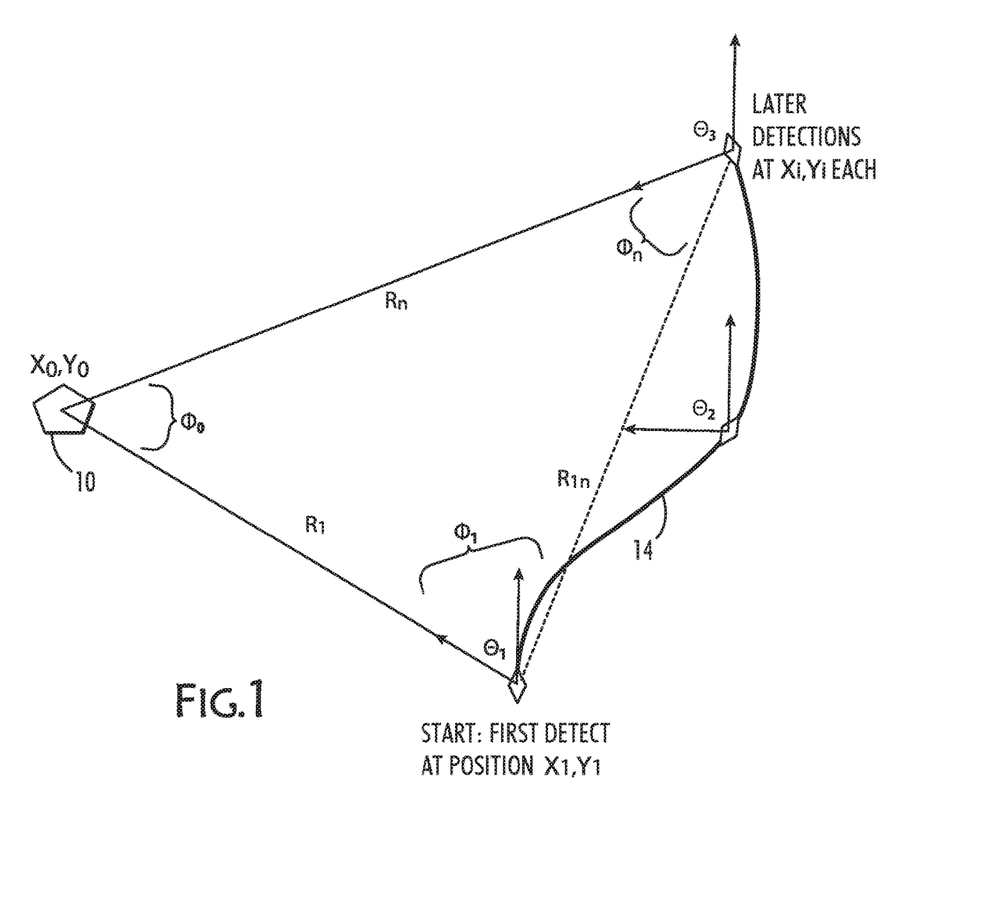
FIG. 1 illustrates an example of the type of problem the present method and apparatus solves.
Figure 2:
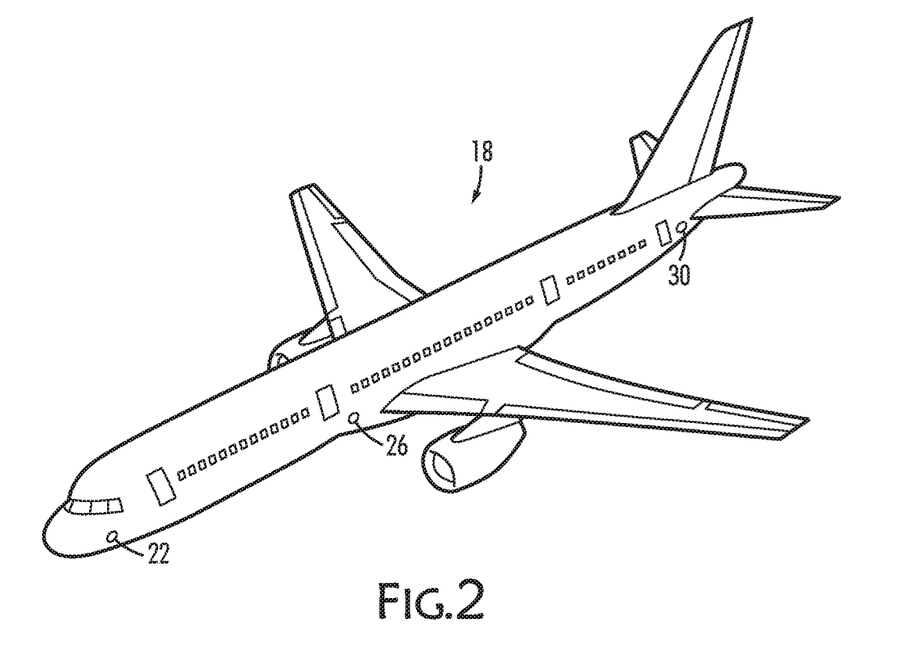
FIG. 2 is an aircraft carrying three cameras, according to an aspect of the disclosure.

Referring now to FIGS. 1 and 2, suppose a source 10 from a bright laser is detected by cameras on a flying aircraft 18 taking path 14. Several images of source 10 are captured at different times as aircraft 18 flies along path 14. The direction to source 10 for each one is provided as an angle between the direction to source 10 and another, well-established, reference direction provided by an on-board navigation system. This reference direction may simply be "North," as indicated by the vertical arrows in FIG. 1, or it may be the direction to any known landmark. At each of the "i" locations of aircraft 18, the angles $\theta_1$, $\theta_2$, and $\theta_3$ between source 10 and North, and the distances $R_1$, $R_{1i}$, and $R_n$ to source 10 can be determined so that the location of source 10 at $X_0$, $Y_0$ can be calculated.

FIG. 2 shows aircraft 18 carrying three cameras or three arrays of cameras 22, 26, 30. Whether one camera 30 captures three images of source 10 or all three cameras 22, 26, 30, capture one image, three spaced-apart images are captured for analysis, one image for each of three platforms, which in this context means three locations in three-dimensional space. These three platforms cooperate to provide the solution to the location of source 10.

These cooperating platforms' solution follows immediately. Suppose that one platform forms, from its series of angular detections, matrices $P_{1MA}$ and $P_{1MB}$ as above:

$$P_{1MA} = \begin{bmatrix} \sum_{i=1}^{n}\left[\frac{\tan^2\theta_i}{\sigma_i^2}\right] & -\sum_{i=1}^{n}\left[\frac{\tan\theta_i}{\sigma_i^2}\right] & \sum_{i=1}^{n}\left[\frac{t_i\tan^2\theta_i}{\sigma_i^2}\right] & -\sum_{i=1}^{n}\left[\frac{t_i\tan\theta_i}{\sigma_i^2}\right] \\ \sum_{i=1}^{n}\left[\frac{\tan\theta_i}{\sigma_i^2}\right] & -\sum_{i=1}^{n}\left[\frac{1}{\sigma_i^2}\right] & \sum_{i=1}^{n}\left[\frac{t_i\tan\theta_i}{\sigma_i^2}\right] & -\sum_{i=1}^{n}\left[\frac{t_i}{\sigma_i^2}\right] \\ \sum_{i=1}^{n}\left[\frac{t_i\tan^2\theta_i}{\sigma_i^2}\right] & -\sum_{i=1}^{n}\left[\frac{t_i\tan\theta_i}{\sigma_i^2}\right] & \sum_{i=1}^{n}\left[\frac{t_i^2\tan^2\theta_i}{\sigma_i^2}\right] & -\sum_{i=1}^{n}\left[\frac{t_i^2\tan\theta_i}{\sigma_i^2}\right] \\ \sum_{i=1}^{n}\left[\frac{t_i\tan\theta_i}{\sigma_i^2}\right] & -\sum_{i=1}^{n}\left[\frac{t_i}{\sigma_i^2}\right] & \sum_{i=1}^{n}\left[\frac{t_i^2\tan\theta_i}{\sigma_i^2}\right] & -\sum_{i=1}^{n}\left[\frac{t_i^2}{\sigma_i^2}\right] \end{bmatrix}$$

$$P_{1MB} = \begin{bmatrix} \sum_{i=1}^{n}\left[\frac{x_i\tan^2\theta_i}{\sigma_i^2}\right] - \sum_{i=1}^{n}\left[\frac{y_i\tan\theta_i}{\sigma_i^2}\right] \\ \sum_{i=1}^{n}\left[\frac{x_i\tan\theta_i}{\sigma_i^2}\right] - \sum_{i=1}^{n}\left[\frac{y_i}{\sigma_i^2}\right] \\ \sum_{i=1}^{n}\left[\frac{x_i t_i\tan^2\theta_i}{\sigma_i^2}\right] - \sum_{i=1}^{n}\left[\frac{y_i t_i\tan\theta_i}{\sigma_i^2}\right] \\ \sum_{i=1}^{n}\left[\frac{x_i t_i\tan\theta_i}{\sigma_i^2}\right] - \sum_{i=1}^{n}\left[\frac{y_i t_i}{\sigma_i^2}\right] \end{bmatrix}$$

Likewise a second platform forms its own similar matrices $P_{2MA}$ and $P_{2MB}$ as above. These matrices represent 16 numbers in the case of $P_{1MA}$, and 4 numbers in the case of $P_{1MB}$. If the first platform communicates these 20 numbers to the second platform, then it is well able to calculate an optimal solution to the location of source 10 as if it were in two places at once, namely, its own and its partners. The optimal solution is:

$$\begin{bmatrix} x_0 \\ y_0 \\ \dot{x}_0 \\ \dot{y}_0 \end{bmatrix} = (P_{1MA} + P_{2MA})^{-1}(P_{1MB} + P_{2MB})$$

The technique is perfectly extendable to an array of cameras approaching a source 10, each communicating their two matrices of collected and processed detections, as above, in the form of their 20 numbers to a processor. Any one camera can then readily contribute to the solution, rather than capturing one image of the source 10 as in FIG. 1. The solution for some number 'm' of cameras is formed as:

$$\begin{bmatrix} x_0 \\ y_0 \\ \dot{x}_0 \\ \dot{y}_0 \end{bmatrix} = (P_{1MA} + P_{2MA} + P_{3MA} + \ldots + P_{mMA})^{-1} \quad (1)$$

$$(P_{1MB} + P_{2MB} + P_{3MB} + \ldots + P_{mMB})$$

$$y_0 + \dot{y}_0 t_i - y_i = \tan\theta_i [x_0 + \dot{x}_0 t_i - x_i]$$

Assume first that the source 10 (the pentagon in FIG. 1) is not stationery but is moving at a constant velocity, with components x(dot) and y(dot). The appropriate regression function is of the form:

$$g = \sum_{i=1}^{n}\left[\frac{y_0 + \dot{y}_0 t_i - y_i - \tan\theta_i[x_0 + \dot{x}_0 t_i - x_i]}{\sigma_i}\right]^2 \quad (2)$$

To be clear, the measurements here are any variable subscripted with an 'i'. The solution is being solved for any variable that is subscripted with a '0'.

A useful estimate of the standard deviation $\sigma_i$ is $$\sigma_i^2 \approx \sigma_r^2 + r_i^2 \sigma_\phi^2$$

where $\sigma_r$ is the standard deviation on camera position itself when the angle measurement is made, $r_i$ is a rough estimate of the range to the target (based upon brightness, or down-angle ranging, or other rough basis), and $\sigma_\phi$ is the standard deviation of the angle measurement itself.

Now assume aircraft 18 is performing a series of detections by capturing a series of images. Consider again the scenario in FIG. 1. An image is made of a source 10. Aircraft 18 may then maneuver. A subsequent series of images is captured. It is assumed that the platform possesses navigation features to give position, platform orientation and time at the moment for the images. To find the best solution to the position of source 10:

$$\frac{\partial g}{\partial x_0} = 0 \Rightarrow \sum_{i=1}^{n}\left[\frac{y_0 + \dot{y}_0 t_i - y_i - \tan\theta_i[x_0 + \dot{x}_0 t_i - x_i]}{\sigma_i^2}\right](-\tan\theta_i) = 0 \quad (3)$$

$$\frac{\partial g}{\partial y_0} = 0 \Rightarrow \sum_{i=1}^{n}\left[\frac{y_0 + \dot{y}_0 t_i - y_i - \tan\theta_i[x_0 + \dot{x}_0 t_i - x_i]}{\sigma_i^2}\right] = 0 \quad (4)$$

$$\frac{\partial g}{\partial \dot{x}_0} = 0 \Rightarrow \sum_{i=1}^{n}\left[\frac{y_0 + \dot{y}_0 t_i - y_i - \tan\theta_i[x_0 + \dot{x}_0 t_i - x_i]}{\sigma_i^2}\right](-\tan\theta_i)t_i = 0 \quad (5)$$

$$\frac{\partial g}{\partial \dot{y}_0} = 0 \Rightarrow \sum_{i=1}^{n}\left[\frac{y_0 + \dot{y}_0 t_i - y_i - \tan\theta_i[x_0 + \dot{x}_0 t_i - x_i]}{\sigma_i^2}\right]t_i = 0 \quad (6)$$

From equation (3), $$0 = -y_0 \sum_{i=1}^{n}\left[\frac{\tan\theta_i}{\sigma_i^2}\right] - \dot{y}_0 \sum_{i=1}^{n}\left[\frac{t_i \tan\theta_i}{\sigma_i^2}\right] + \sum_{i=1}^{n}\left[\frac{y_i \tan\theta_i}{\sigma_i^2}\right] + \quad (7)$$

$$x_0 \sum_{i=1}^{n}\left[\frac{\tan^2\theta_i}{\sigma_i^2}\right] + \dot{x}_0 \sum_{i=1}^{n}\left[\frac{t_i \tan^2\theta_i}{\sigma_i^2}\right] - \sum_{i=1}^{n}\left[\frac{x_i \tan^2\theta_i}{\sigma_i^2}\right]$$

From Equation (4), $$0 = -y_0 \sum_{i=1}^{n}\left[\frac{1}{\sigma_i^2}\right] - \dot{y}_0 \sum_{i=1}^{n}\left[\frac{t_i}{\sigma_i^2}\right] + \sum_{i=1}^{n}\left[\frac{y_i}{\sigma_i^2}\right] + \qquad (8)$$

$$x_0 \sum_{i=1}^{n}\left[\frac{\tan\theta_i}{\sigma_i^2}\right] + \dot{x}_0 \sum_{i=1}^{n}\left[\frac{t_i \tan\theta_i}{\sigma_i^2}\right] - \sum_{i=1}^{n}\left[\frac{x_i \tan\theta_i}{\sigma_i^2}\right]$$

From Equation (5), $$0 = -y_0 \sum_{i=1}^{n}\left[\frac{t_i \tan\theta_i}{\sigma_i^2}\right] - \dot{y}_0 \sum_{i=1}^{n}\left[\frac{t_i^2 \tan\theta_i}{\sigma_i^2}\right] + \sum_{i=1}^{n}\left[\frac{y_i t_i \tan\theta_i}{\sigma_i^2}\right] + \qquad (9)$$

$$x_0 \sum_{i=1}^{n}\left[\frac{t_i \tan^2\theta_i}{\sigma_i^2}\right] + \dot{x}_0 \sum_{i=1}^{n}\left[\frac{t_i^2 \tan^2\theta_i}{\sigma_i^2}\right] - \sum_{i=1}^{n}\left[\frac{x_i t_i \tan^2\theta_i}{\sigma_i^2}\right]$$

From Equation (6), $$0 = -y_0 \sum_{i=1}^{n}\left[\frac{t_i}{\sigma_i^2}\right] - \dot{y}_0 \sum_{i=1}^{n}\left[\frac{t_i^2}{\sigma_i^2}\right] + \sum_{i=1}^{n}\left[\frac{y_i t_i}{\sigma_i^2}\right] + \qquad (10)$$

$$x_0 \sum_{i=1}^{n}\left[\frac{t_i \tan\theta_i}{\sigma_i^2}\right] + \dot{x}_0 \sum_{i=1}^{n}\left[\frac{t_i^2 \tan\theta_i}{\sigma_i^2}\right] - \sum_{i=1}^{n}\left[\frac{x_i t_i \tan\theta_i}{\sigma_i^2}\right]$$

Putting these together into a single matrix equation:

$$\begin{bmatrix} \sum_{i=1}^{n}\left[\frac{\tan^2\theta_i}{\sigma_i^2}\right] & -\sum_{i=1}^{n}\left[\frac{\tan\theta_i}{\sigma_i^2}\right] & \sum_{i=1}^{n}\left[\frac{t_i \tan^2\theta_i}{\sigma_i^2}\right] & -\sum_{i=1}^{n}\left[\frac{t_i \tan\theta_i}{\sigma_i^2}\right] \\ \sum_{i=1}^{n}\left[\frac{\tan\theta_i}{\sigma_i^2}\right] & -\sum_{i=1}^{n}\left[\frac{1}{\sigma_i^2}\right] & \sum_{i=1}^{n}\left[\frac{t_i \tan\theta_i}{\sigma_i^2}\right] & -\sum_{i=1}^{n}\left[\frac{t_i}{\sigma_i^2}\right] \\ \sum_{i=1}^{n}\left[\frac{t_i \tan^2\theta_i}{\sigma_i^2}\right] & -\sum_{i=1}^{n}\left[\frac{t_i \tan\theta_i}{\sigma_i^2}\right] & \sum_{i=1}^{n}\left[\frac{t_i^2 \tan^2\theta_i}{\sigma_i^2}\right] & -\sum_{i=1}^{n}\left[\frac{t_i^2 \tan\theta_i}{\sigma_i^2}\right] \\ \sum_{i=1}^{n}\left[\frac{t_i \tan\theta_i}{\sigma_i^2}\right] & -\sum_{i=1}^{n}\left[\frac{t_i}{\sigma_i^2}\right] & \sum_{i=1}^{n}\left[\frac{t_i^2 \tan\theta_i}{\sigma_i^2}\right] & -\sum_{i=1}^{n}\left[\frac{t_i^2}{\sigma_i^2}\right] \end{bmatrix} \begin{bmatrix} x_0 \\ y_0 \\ \dot{x}_0 \\ \dot{y}_0 \end{bmatrix} = \begin{bmatrix} \sum_{i=1}^{n}\left[\frac{x_i \tan^2\theta_i}{\sigma_i^2}\right] - \sum_{i=1}^{n}\left[\frac{y_i \tan\theta_i}{\sigma_i^2}\right] \\ \sum_{i=1}^{n}\left[\frac{x_i \tan\theta_i}{\sigma_i^2}\right] - \sum_{i=1}^{n}\left[\frac{y_i}{\sigma_i^2}\right] \\ \sum_{i=1}^{n}\left[\frac{x_i t_i \tan^2\theta_i}{\sigma_i^2}\right] - \sum_{i=1}^{n}\left[\frac{y_i t_i \tan\theta_i}{\sigma_i^2}\right] \\ \sum_{i=1}^{n}\left[\frac{x_i t_i \tan\theta_i}{\sigma_i^2}\right] - \sum_{i=1}^{n}\left[\frac{y_i t_i}{\sigma_i^2}\right] \end{bmatrix}$$

The full optimal solution to the position of the source 10 and of its motion is had by the equation:

$$\begin{bmatrix} x_0 \\ y_0 \\ \dot{x}_0 \\ \dot{y}_0 \end{bmatrix} =$$

$$\begin{bmatrix} \sum_{i=1}^{n}\left[\frac{\tan^2\theta_i}{\sigma_i^2}\right] & -\sum_{i=1}^{n}\left[\frac{\tan\theta_i}{\sigma_i^2}\right] & \sum_{i=1}^{n}\left[\frac{t_i \tan^2\theta_i}{\sigma_i^2}\right] & -\sum_{i=1}^{n}\left[\frac{t_i \tan\theta_i}{\sigma_i^2}\right] \\ \sum_{i=1}^{n}\left[\frac{\tan\theta_i}{\sigma_i^2}\right] & -\sum_{i=1}^{n}\left[\frac{1}{\sigma_i^2}\right] & \sum_{i=1}^{n}\left[\frac{t_i \tan\theta_i}{\sigma_i^2}\right] & -\sum_{i=1}^{n}\left[\frac{t_i}{\sigma_i^2}\right] \\ \sum_{i=1}^{n}\left[\frac{t_i \tan^2\theta_i}{\sigma_i^2}\right] & -\sum_{i=1}^{n}\left[\frac{t_i \tan\theta_i}{\sigma_i^2}\right] & \sum_{i=1}^{n}\left[\frac{t_i^2 \tan^2\theta_i}{\sigma_i^2}\right] & -\sum_{i=1}^{n}\left[\frac{t_i^2 \tan\theta_i}{\sigma_i^2}\right] \\ \sum_{i=1}^{n}\left[\frac{t_i \tan\theta_i}{\sigma_i^2}\right] & -\sum_{i=1}^{n}\left[\frac{t_i}{\sigma_i^2}\right] & \sum_{i=1}^{n}\left[\frac{t_i^2 \tan\theta_i}{\sigma_i^2}\right] & -\sum_{i=1}^{n}\left[\frac{t_i^2}{\sigma_i^2}\right] \end{bmatrix}^{-1} \begin{bmatrix} \sum_{i=1}^{n}\left[\frac{x_i \tan^2\theta_i}{\sigma_i^2}\right] - \sum_{i=1}^{n}\left[\frac{y_i \tan\theta_i}{\sigma_i^2}\right] \\ \sum_{i=1}^{n}\left[\frac{x_i \tan\theta_i}{\sigma_i^2}\right] - \sum_{i=1}^{n}\left[\frac{y_i}{\sigma_i^2}\right] \\ \sum_{i=1}^{n}\left[\frac{x_i t_i \tan^2\theta_i}{\sigma_i^2}\right] - \sum_{i=1}^{n}\left[\frac{y_i t_i \tan\theta_i}{\sigma_i^2}\right] \\ \sum_{i=1}^{n}\left[\frac{x_i t_i \tan\theta_i}{\sigma_i^2}\right] - \sum_{i=1}^{n}\left[\frac{y_i t_i}{\sigma_i^2}\right] \end{bmatrix}$$

At least four angle measurements of separate images—and more for greater accuracy—may be made to gauge an estimate of the position and motion of the source 10. If the source 10 is assumed to be stationary, then the solution to the above equation is more conveniently expressed as:

$$\begin{bmatrix} x_0 \\ y_0 \\ \dot{x}_0 \\ \dot{y}_0 \end{bmatrix} =$$

$$\begin{bmatrix} \sum_{i=1}^{n}\left[\frac{\tan^2\theta_i}{\sigma_i^2}\right] & -\sum_{i=1}^{n}\left[\frac{\tan\theta_i}{\sigma_i^2}\right] & 0 & 0 \\ \sum_{i=1}^{n}\left[\frac{\tan\theta_i}{\sigma_i^2}\right] & -\sum_{i=1}^{n}\left[\frac{1}{\sigma_i^2}\right] & 0 & 0 \\ 0 & 0 & 0 & 0 \\ 0 & 0 & 0 & 0 \end{bmatrix}^{-1} \begin{bmatrix} \sum_{i=1}^{n}\left[\frac{x_i \tan^2\theta_i}{\sigma_i^2}\right] - \sum_{i=1}^{n}\left[\frac{y_i \tan\theta_i}{\sigma_i^2}\right] \\ \sum_{i=1}^{n}\left[\frac{x_i \tan\theta_i}{\sigma_i^2}\right] - \sum_{i=1}^{n}\left[\frac{y_i}{\sigma_i^2}\right] \\ 0 \\ 0 \end{bmatrix}$$

Now assume multiple cameras, such as cameras 22, 26, 30, are all on aircraft 18 with captured images.

The cooperating-camera solution follows immediately from above. Suppose that camera 22 forms, from its series of angular detections, the following matrices $P_{1MA}$ and $P_{1MB}$ as above:

$$P_{1MA} = \begin{bmatrix} \sum_{i=1}^{n}\left[\frac{\tan^2\theta_i}{\sigma_i^2}\right] & -\sum_{i=1}^{n}\left[\frac{\tan\theta_i}{\sigma_i^2}\right] & \sum_{i=1}^{n}\left[\frac{t_i\tan^2\theta_i}{\sigma_i^2}\right] & -\sum_{i=1}^{n}\left[\frac{t_i\tan\theta_i}{\sigma_i^2}\right] \\ \sum_{i=1}^{n}\left[\frac{\tan\theta_i}{\sigma_i^2}\right] & -\sum_{i=1}^{n}\left[\frac{1}{\sigma_i^2}\right] & \sum_{i=1}^{n}\left[\frac{t_i\tan\theta_i}{\sigma_i^2}\right] & -\sum_{i=1}^{n}\left[\frac{t_i}{\sigma_i^2}\right] \\ \sum_{i=1}^{n}\left[\frac{t_i\tan^2\theta_i}{\sigma_i^2}\right] & -\sum_{i=1}^{n}\left[\frac{t_i\tan\theta_i}{\sigma_i^2}\right] & \sum_{i=1}^{n}\left[\frac{t_i^2\tan^2\theta_i}{\sigma_i^2}\right] & -\sum_{i=1}^{n}\left[\frac{t_i^2\tan\theta_i}{\sigma_i^2}\right] \\ \sum_{i=1}^{n}\left[\frac{t_i\tan\theta_i}{\sigma_i^2}\right] & -\sum_{i=1}^{n}\left[\frac{t_i}{\sigma_i^2}\right] & \sum_{i=1}^{n}\left[\frac{t_i^2\tan\theta_i}{\sigma_i^2}\right] & -\sum_{i=1}^{n}\left[\frac{t_i^2}{\sigma_i^2}\right] \end{bmatrix}$$

$$P_{1MB} = \begin{bmatrix} \sum_{i=1}^{n}\left[\frac{x_i\tan^2\theta_i}{\sigma_i^2}\right] - \sum_{i=1}^{n}\left[\frac{y_i\tan\theta_i}{\sigma_i^2}\right] \\ \sum_{i=1}^{n}\left[\frac{x_i\tan\theta_i}{\sigma_i^2}\right] - \sum_{i=1}^{n}\left[\frac{y_i}{\sigma_i^2}\right] \\ \sum_{i=1}^{n}\left[\frac{x_it_i\tan^2\theta_i}{\sigma_i^2}\right] - \sum_{i=1}^{n}\left[\frac{y_it_i\tan\theta_i}{\sigma_i^2}\right] \\ \sum_{i=1}^{n}\left[\frac{x_it_i\tan\theta_i}{\sigma_i^2}\right] - \sum_{i=1}^{n}\left[\frac{y_it_i}{\sigma_i^2}\right] \end{bmatrix}$$

Likewise camera 26 forms its own similar matrices $P_{2MA}$ and $P_{2MB}$ as above. These matrices represent 16 numbers in the case of $P_{1MA}$, and 4 numbers in the case of $P_{1MB}$. If camera 22 communicates these 20 numbers to camera 26, then camera 26 is well able to calculate an optimal solution to the location of the source 10 as if it were in two places at once, its own and that of camera 22. The optimal solution is $$\begin{bmatrix} x_0 \\ y_0 \\ \dot{x}_0 \\ \dot{y}_0 \end{bmatrix} = (P_{1MA} + P_{2MA})^{-1}(P_{1MB} + P_{2MB})$$

The technique perfectly extends to an array of cameras approaching a source 10 communicating their two matrices of collected and processed images, as above, in the form of their 20 numbers to a processor. Any one camera can then readily form the best solution as if it were instantaneously at every camera point at once, rather than flying path 14 past source 10 as in FIG. 1. The solution for some number 'm' of air platform measurements is formed as:

$$\begin{bmatrix} x_0 \\ y_0 \\ \dot{x}_0 \\ \dot{y}_0 \end{bmatrix} = (P_{1MA} + P_{2MA} + P_{3MA} + \ldots + P_{mMA})^{-1}$$

$$(P_{1MB} + P_{2MB} + P_{3MB} + \ldots + P_{mMB})$$

In FIG. 1, camera 22 is located on a different part of aircraft 18 than cameras 26 and 30. Simultaneous images from cameras 22, 26, 30, will have slightly different degrees of parallax because of their different locations on aircraft 18. That different parallax can be used to reduce the uncertainty in the location of source 10. In addition, cameras 22, 26, 30, may be different types of cameras or may capture different images in different ways. For example, camera 30 may carry a filter 32 for visible light except red and infrared. Camera 26 may be a camera array. Camera 22 may be a high speed camera to better detect muzzle flashes. Cameras 22 and 26 are forward-looking; camera 30 is rearward-looking; other cameras may be side-looking. Cameras 22, 26, 30, may capture images using an array of charge coupled devices or an array of complementary metal oxide semiconductors.

Figure 3:
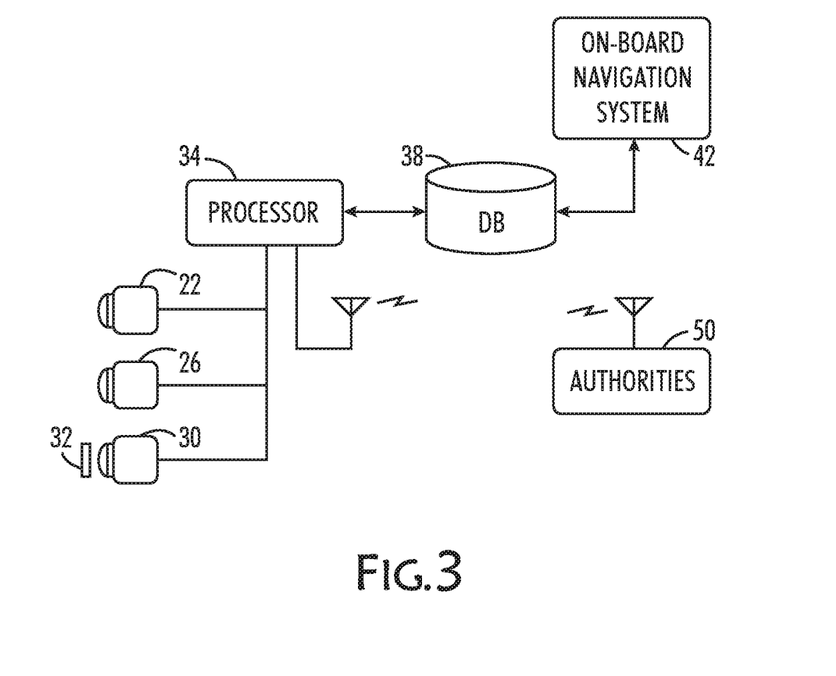
FIG. 3 is a schematic diagram of an apparatus for detecting bright lights from a moving aircraft, according to an aspect of the disclosure.
Figure 4:
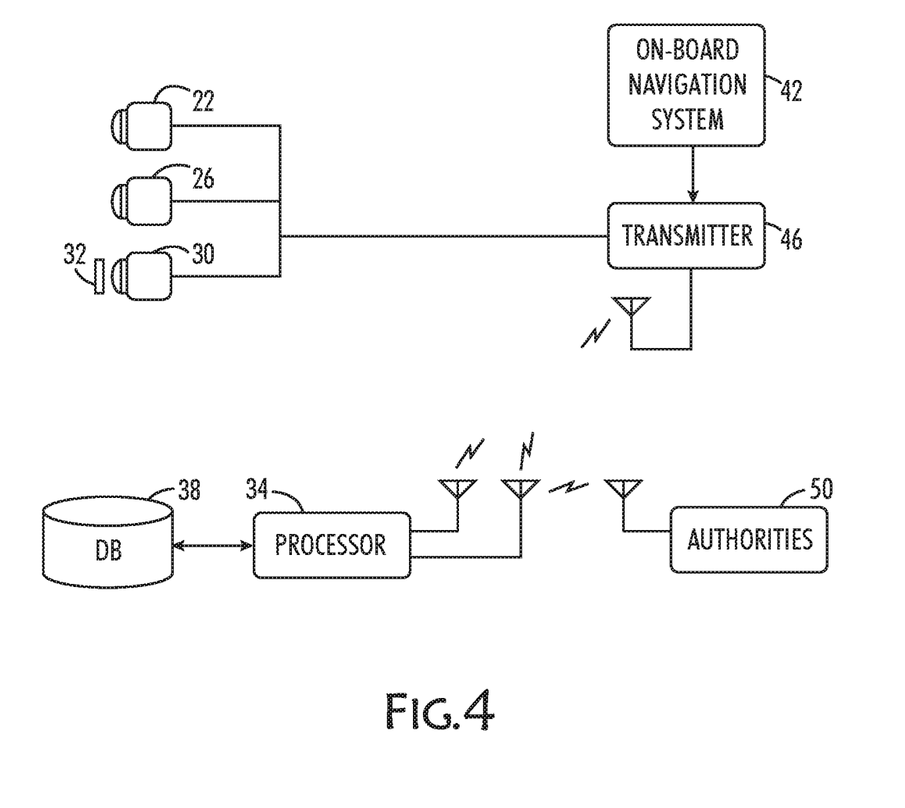
FIG. 4 is a schematic diagram of an alternative apparatus for detecting bright lights from a moving aircraft, according to an aspect of the disclosure.

The images are forwarded from cameras 22, 26, 30, to a processor 34, which has access to a database 38 of flight information carried by and in operational connection with said aircraft 18. Processor 34 is in electronic communication with cameras 22, 26, 30 and with database 38 so that it receives captured images and has access to information about the motion of aircraft 18. Database 38 stores flight information from the on-board navigation system 42, including motion, direction, and position of aircraft 18 and ground location information, that is useful to process the data derived from the images and determine the ground location of source 10. Specifically, database 38 contains altitude, roll, pitch, yaw, direction, air speed, ground speed, GPS (global positioning satellite) information, ground information such as topographic maps in particular, and weather information for the area, which may be useful to processor 34 for determining the location of the source 10 of a bright light. Processor 34 may be carried by aircraft 18, or be remote from it, as illustrated in FIG. 4. Database 38 with stored navigation information data regarding aircraft 18 may additionally be located on the ground, such as at an airport, for example. If processor 34 and database 38 are on the ground, a transmitter 46 on aircraft 18 transmits data from cameras 22, 26, 30 to processor 34.

There are advantages to either location. Weight is a concern in aircraft 18. Perhaps more importantly are the issues of battery power, heat generation, and the impact of vibration on electronic equipment. Because most instances of individuals shooting or shining lasers at aircraft 18 happen when aircraft 18 are taking off or landing, an airport may be a suitable place for processor 34. Also, an airport may be more likely to have access to the topographic information its surroundings, and it can also be more recent information and well-verified information.

Processor 34 is configured to perform a spectral analysis on the image. Spectral analysis of photographic image data is well-known, and is used here to determine which light source in an image is a threat, such as a bright light from a laser or a muzzle flash. Processor 34 may proceed by removing extraneous information from the captured image and then by identifying any bright light source 10 that remains. A filter 32 may help to remove extraneous information, such as that light having wavelengths of no interest. Filter 32 may also be used to identify light sources directly, such as those filters that remove light other than those in the red laser frequencies or those that remove light except those in the signature frequencies for gunpowder combustion products. Glare can mask light from sources so polarizing filters may be helpful especially if aircraft 18 is flying over water, snow or other reflective surfaces.

When source 10 is located, its ground location can be forwarded via a communications link from processor 34 to authorities 50 such as a law enforcement agency.

Figure 5A:
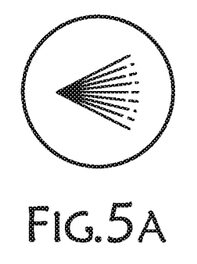
FIGS. 5A, 5B, and 5C are views of three different laser images captured by a camera, according to aspects of the disclosure.
Figure 5B:
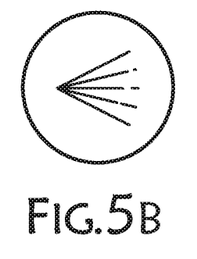
Figure 5C:
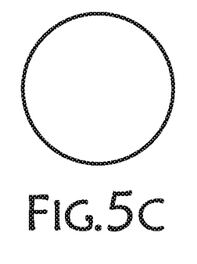

If source 10 is a laser, the image captured will contain a smaller dispersion pattern of laser light because laser light is coherent. That image may or may not contain internal structure. Internal structure refers to the portions of the dispersion pattern that are brighter than other parts and may contain a brightest point adjacent to a darker area. FIGS. 5A-5C illustrate dispersion patterns of detected laser light from images. FIG. 5A shows a pattern of detected laser light with internal structure; FIG. 5B shows a pattern of laser light with some internal structure; and FIG. 5C shows a pattern of laser light with no internal structure. Using edge detection software, the structure in a pattern such as those shown in FIGS. 5A and 5B, can be analyzed. If structure is detected, the source is presumed to be coming from the sharpest corner of the detected structure. If no structure is detectable, the geometric center of the dispersion pattern is presumed to be the source.

When introducing elements of the present disclosure or exemplary aspects thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific aspects, the details of these aspects are not to be construed as limitations.

What is claimed is:

1. A light source detection system, comprising:
   an aircraft;
   at least one camera carried by said aircraft;
   a database, said database storing motion, direction, and position information of said aircraft and ground location information; and
   a processor having access to said database and in electronic communication with said at least one camera, said processor configured to:
      identify light as being light from a laser when said at least one camera records an image of said light from a light source;
      detect whether said light recorded in said image has an internal structure based on a dispersion pattern of said light, wherein said light recorded in said image has said internal structure when a portion of the dispersion pattern is brighter than another portion of the dispersion pattern;
      determine a ground location corresponding to a source of said light based on whether said internal structure is detected for said light.

2. The light source detection system as recited in claim 1, wherein said processor is configured to:
   determine that said ground location corresponds to a brightest point of said dispersion pattern if said internal structure is detected for said light; and
   determine that said ground location corresponds to a geometric center of said dispersion pattern if no internal structure is detected for said light.

3. The light source detection system as recited in claim 1, wherein said processor is configured to perform a spectral analysis to identify said light from said laser in said image.

4. The light source detection system as recited in claim 1, wherein said processor is configured to perform a spectral analysis to identify light from a muzzle flash in said image.

5. The light source detection system as recited in claim 1, wherein said at least one camera has a filter.

6. The light source detection system as recited in claim 1, wherein said at least one camera has a wavelength filter.

7. The light source detection system as recited in claim 1, wherein said at least one camera has a polarizing filter.

8. The light source detection system as recited in claim 1, wherein said processor is located remote from said aircraft.

9. The light source detection system as recited in claim 1, wherein said processor is on the ground.

10. The light source detection system as recited in claim 1, wherein said processor is at an airport.

11. The light source detection system as recited in claim 1, further comprising a communications link from said aircraft to authorities.

12. The light source detection system as recited in claim 1, further comprising a communications link from said processor to authorities.

13. The light source detection system as recited in claim 1, wherein said at least one camera is at least two cameras and wherein a camera of said at least two cameras takes a different image than another camera of said at least two cameras.

14. The light source detection system as recited in claim 1, wherein said at least one camera is an array of cameras.

15. The light source detection system as recited in claim 1, wherein said at least one camera is at least two cameras and wherein a camera of said at least two cameras is located on a different part of said aircraft.

16. The light source detection system as recited in claim 1, further comprising a second aircraft, said second aircraft carrying a camera, said processor being in operational communication with said camera of said second aircraft.

17. A light source detection system, comprising:
   an aircraft;
   at least one camera carried by said aircraft;
   a database, said database in operational connection with said aircraft and configured to store motion, direction, and position information of said aircraft and to store ground location information;
   a processor having access to said database, said processor being in electronic communication with said at least one camera, said processor configured to:
      identify light as being light from a laser when said at least one camera records an image of said light from a source of said light;
      detect whether said light recorded in said image has an internal structure based on a dispersion pattern of said light, wherein said light recorded in said image has said internal structure when a portion of the dispersion pattern is brighter than another portion of the dispersion pattern;
      estimate a ground location of said source of said light based on whether said internal structure is detected for said light; and
      determine whether said source of light is harmful to said aircraft; and
   a communications link to authorities to provide said ground location of said source of light.

18. The system of claim 17, wherein said processor is configured to:
   estimate that said ground location corresponds to a brightest point of said dispersion pattern if said internal structure is detected for said light; and
   estimate that said ground location corresponds to a geometric center of said dispersion pattern if no internal structure is detected for said light.

19. The light source detection system of claim 17, wherein said processor is configured to determine said ground location of said source of light from said speed, direction, and position of said aircraft from said database and a direction to said light from said at least one camera.

20. The light source detection system of claim 18, wherein said ground location information includes topographic information, and wherein said processor is configured to determine said ground location of said source of light from said topographic information.

21. The light source detection system of claim 17, wherein said at least one camera is an array of cameras.

22. The light source detection system of claim 17, wherein said at least one camera receives said image by an array of charge coupled devices.

23. The light source detection system of claim 17, wherein said at least one camera receives said image by an array of complementary metal oxide semiconductors.

24. A method of detecting a location of a light source, said method comprising the steps of:
   capturing at least one image of light directed at an aircraft from a light source;
   determining speed, direction and orientation of said aircraft at a time when said at least one image is captured;
   determining a line running from said aircraft to said light source using said at least one image and said speed, said direction and said orientation of said aircraft when said image was captured;
   identifying said light in said at least one image as a laser light;
   detecting whether said laser light has an internal structure based on a dispersion pattern of said laser light, wherein said laser light in said at least one image has said internal structure when a portion of the dispersion pattern is brighter than another portion of the dispersion pattern; and
   determining a location on the ground corresponding to a preselected vertical distance between said line and the ground based on whether said internal structure is detected for said laser light.

25. The method as recited in claim 24, further comprising:
   determining that said ground location corresponds to a brightest point of said dispersion pattern if said internal structure is detected for said laser light; and
   determine that said ground location corresponds to a geometric center of said dispersion pattern if no internal structure is detected for said laser light.

26. The method as recited in claim 24, further comprising the step of processing said at least one image to determine if said image was a muzzle flash.

27. The method as recited in claim 24, further comprising the step of processing said at least one image to determine if said is said laser light.

28. The method as recited in claim 24, further comprising the step of capturing images from at least two cameras carried on said aircraft.

29. The method as recited in claim 24, further comprising the step of notifying authorities if said image contains laser light.

30. The method as recited in claim 24, further comprising the step of notifying authorities if said image contains a muzzle flash.

* * * * *